US012331543B2

(12) United States Patent
He et al.

(10) Patent No.: US 12,331,543 B2
(45) Date of Patent: Jun. 17, 2025

(54) HANDLE STRUCTURE AND DOOR BODY

(71) Applicant: Kohler (China) Investment Co., Ltd., Shanghai (CN)

(72) Inventors: Kun He, Shanghai (CN); Zhongpeng Zha, Shanghai (CN); Feipeng Lv, Shanghai (CN); Kaixian Yang, Shanghai (CN); Xin Liu, Shanghai (CN); Yongde Tang, Shanghai (CN)

(73) Assignee: Kohler (China) Investment Co., Ltd., Shanghai (CN)

( * ) Notice: Subject to any disclaimer, the term of this patent is extended or adjusted under 35 U.S.C. 154(b) by 77 days.

(21) Appl. No.: 18/068,889

(22) Filed: Dec. 20, 2022

(65) Prior Publication Data

US 2023/0203836 A1 Jun. 29, 2023

(51) Int. Cl.
*E05B 1/00* (2006.01)

(52) U.S. Cl.
CPC .................................. *E05B 1/0015* (2013.01)

(58) Field of Classification Search
CPC .. E05B 1/0015; E05B 65/0025; E06B 3/5436; A47F 3/0434
See application file for complete search history.

(56) References Cited

U.S. PATENT DOCUMENTS 2,893,458 A * 7/1959 Flora ..................... E05B 1/0015
411/970
3,047,186 A * 7/1962 Serio ..................... A47J 45/063
220/231
3,593,550 A * 7/1971 Berkowitz .......... E05B 65/0042
70/207
5,087,005 A * 2/1992 Holoff ................ A47G 23/0225
248/205.8
6,463,628 B1 * 10/2002 Yeh ....................... E05B 1/0015
292/DIG. 53
7,913,464 B2 * 3/2011 Eckelt ............... B32B 17/10036
52/204.593
8,360,488 B2 * 1/2013 Forrest .................. E05B 1/0015
292/355
8,607,506 B2 * 12/2013 Bouthillier ............ E05B 1/0015
49/460

(Continued)

FOREIGN PATENT DOCUMENTS

CN 209924600 U * 1/2020
DE 202004015691 U1 * 1/2005 ........... E05B 1/0015

(Continued)

*Primary Examiner* — Jason W San
*Assistant Examiner* — Matthew J Sullivan
(74) *Attorney, Agent, or Firm* — FOLEY & LARDNER LLP

(57) ABSTRACT

A handle structure includes a first handle body, a second handle body, and a transparent plate. The first handle body includes a first handle portion and a first connecting portion. The second handle body includes a second handle portion and a second connecting portion. The first handle body and the second handle body are hollow. The first connecting portion is detachably connected with the second connecting portion when the first handle body and the second handle body are in an installed position. The transparent plate is within and sealingly connected with the first connecting portion and the second connecting portion when the first handle body and the second handle body are in the installed position.

19 Claims, 2 Drawing Sheets

(56) References Cited

U.S. PATENT DOCUMENTS

| | | | | |
|---|---|---|---|---|
| 9,309,691 B2 * | 4/2016 | Chang | E05B 1/0015 | |
| 11,208,235 B2 * | 12/2021 | Truong | A47J 45/063 | |
| 11,719,019 B2 * | 8/2023 | Dulmes | A47K 3/36 | 16/412 |
| 2004/0078933 A1 * | 4/2004 | Forrest | E05B 1/0015 | 16/417 |
| 2006/0107781 A1 * | 5/2006 | Yao | F16H 59/0278 | 74/523 |
| 2008/0005983 A1 * | 1/2008 | Lin | E06B 3/5436 | 52/235 |
| 2010/0320346 A1 * | 12/2010 | Phillips | F16B 11/006 | 248/309.1 |
| 2012/0005822 A1 * | 1/2012 | Daubmann | A47K 10/10 | 4/607 |
| 2016/0369552 A1 * | 12/2016 | Sprague | E05B 65/0025 | |
| 2022/0010583 A1 * | 1/2022 | Brenner | G09F 3/00 | |
| 2022/0120009 A1 * | 4/2022 | Huang | H01H 19/14 | |

FOREIGN PATENT DOCUMENTS

| | | | | |
|---|---|---|---|---|
| DE | 202014004673 U1 * | 8/2014 | E05B 1/0015 |
| GB | 191304657 A * | 12/1985 | |
| JP | 03222919 A * | 10/1991 | |

* cited by examiner

HANDLE STRUCTURE AND DOOR BODY

CROSS REFERENCE TO RELATED PATENT APPLICATION

This application claims the benefit of and priority to Chinese Patent Application No. 202123302104.2, filed on Dec. 25, 2021, the disclosure of which is incorporated herein by reference in its entirety.

TECHNICAL FIELD

The present disclosure relates to the technical field of door handles. More specifically, to a handle structure for a shower room.

BACKGROUD

With improving living standards, people have higher and higher (i.e., growing) requirements and performance expectations for household supplies and equipment. For a shower room (e.g., shower stall, shower enclosure, shower area, etc.) in a bathroom (e.g., lavatory, restroom, bathing room, etc.), a structural shape of a handle of the shower room can dictate the shape and ergonomics of the shower room.

A handle (e.g., a handle structure) for a shower room facilitates a user transitioning a shower door between an open position and a closed position. A handle can be directly bonded or mounted to two sides (e.g., opposite sides, the inward facing and outward facing surfaces, etc.) of a door of a shower room. A handle may be graspable by a user and may pass through one or more holes of a shower door.

SUMMARY

At least one embodiment relates to a handle structure including a first handle body, a second handle body, and a transparent plate. The first handle body includes a first handle portion and a first connecting portion. The second handle body includes a second handle portion and a second connecting portion. The first handle body and the second handle body are hollow. The first connecting portion is detachably connected with the second connecting portion when the first handle body and the second handle body are in an installed position. The transparent plate is within and sealingly connected with the first connecting portion and the second connecting portion when the first handle body and the second handle body are in the installed position.

Another embodiment relates to a shower door including a door panel and a handle structure including a first handle body, a second handle body, and a transparent plate. The first handle body and the second handle body are respectively located on two sides of the door panel. The first handle body and the second handle body are sleeve structures and respectively include a handle portion and a connecting portion. The connecting portion of the first handle body is detachably connected with the connecting portion of the second handle body. A transparent plate is within and hermetically connected with the connecting portions of the first handle body and the second handle body.

Another embodiment relates to a handle structure including a first hollow handle body, a second hollow handle body, and a transparent plate. The first hollow handle body defines a first conduit and includes a first handle portion and a first connecting portion. The second hollow handle body defines a second conduit and includes a second handle portion and a second connecting portion. The second connecting portion is configured to detachably couple with the first connecting portion. The transparent plate is configured to fluidly separate the first conduit and the second conduit when the first connecting portion and the second connecting portion are detachably coupled.

In some embodiments, the transparent decorative sheet is axially and hermetically connected with the connecting portions of the first handle body and the second handle body through a first internal sealing gasket.

In some embodiments, the handle portion and an inner wall of the connecting portion of the first handle body are transitioned through a first shoulder, the handle portion and an inner wall of the connecting portion of the second handle body are transitioned through a second shoulder, the transparent decorative sheet and the first internal sealing gasket are located in a region between the first shoulder and the second shoulder, and the transparent decorative sheet is abutted against the first shoulder or the second shoulder through the first internal sealing gasket.

In some embodiments, a protective gasket is further comprised, wherein one end of the protective gasket is abutted against the first shoulder or the second shoulder, and the other side of the protective gasket is abutted against one side of the transparent decorative sheet far away from the first internal sealing gasket.

In some embodiments, the transparent decorative sheet is radially and hermetically connected with the connecting portions of the first handle body and the second handle body through a first sealing ring.

In some embodiments, the handle portion and the connecting portion of the first handle body are transitioned through a first shoulder, the handle portion and the connecting portion of the second handle body are transitioned through a second shoulder, the transparent decorative sheet and the first sealing ring are located in a region between the first shoulder and the second shoulder, the first sealing ring is sleeved on the transparent decorative sheet, and an outer ring of the first sealing ring is abutted against an inner wall of the connecting portion of the first handle body or the second handle body.

In some embodiments, two protective gaskets are further comprised, wherein the two the protective gaskets are respectively located between the transparent decorative sheet and the first shoulder and between the transparent decorative sheet and the second shoulder.

In some embodiments, the connecting portions of the first handle body and the second handle body are in thread connection.

In some embodiments, a first external sealing gasket and a second external sealing gasket which are respectively located on the two sides of the door panel are further comprised, wherein the first external sealing gasket and the second external sealing gasket are respectively sleeved on outer walls of the connecting portions of the first handle body and the second handle body.

In some embodiments, at least one fastening mounting hole is arranged on outer sides of the handle portions of the first handle body and the second handle body, and the fastening mounting hole is used for being matched with a fastening tool to fasten the first handle body and the second handle body.

In some embodiments, a first anti-slip sleeve and a second anti-slip sleeve which are respectively sleeved on the handle portion of the first handle body and the handle portion of the second handle body are further comprised, wherein the first anti-slip sleeve and the second anti-slip sleeve cover a region at which the fastening mounting hole is located.

Another embodiment relates to a door body including a door panel and a handle structure mounted on the door panel.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
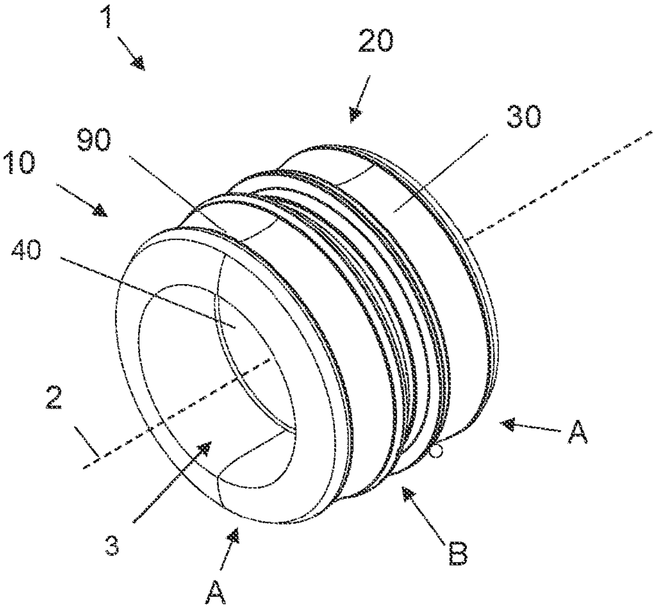
FIG. 1 is a schematic diagram of a handle structure provided, according to some embodiments.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting. The various concepts introduced above and discussed in greater detail below may be implemented in any number of ways, as the described concepts are not limited to any particular manner of implementation. Examples of specific implementations and applications are provided primarily for illustrative purposes.

In the description of the application, it should be noted that, the orientation or positional relationships indicated by the terms “center”, “up”, “down”, “left”, “right”, “vertical”, “horizontal”, “inside”, “outside” and the like are orientation or positional relationships based on the accompanying drawings, which are only for convenience and simplification of the description of the application, but are not intended to indicate or imply that the indicated device or element must have a specific orientation, be constructed and operated in a specific orientation, and thus, cannot be understood as a limitation to the application. Moreover, the terms “first”, “second” and “third” are used for descriptive purposes only and cannot be understood as indicating or implying relative importance.

In the description of the application, it should be noted that unless expressly stipulated and defined otherwise, terms such as “installation”, “connected” and “connection”, etc., should be understood broadly, for example, the connection may be fixed connection, or detachable connection or integral connection; may be direct connection, may also be indirect connection through an intermediate medium, and may also be internal communication of two elements. The specific meaning of the above terms in the application can be understood in a specific case by those having ordinary skills in the art.

A handle structure can have a hollow handle structure and a handle body with a cavity formed in a central region of the handle. Typical hollow handle structures are often directly bonded or mounted to two sides (e.g., opposite sides) of a door of the shower room, which is difficult to install (e.g., assemble) and/or uninstall (e.g., disassemble and/or remove for maintenance, replacement, etc.). Typical hollow handle structures involve multiple components that are easy to misplace (e.g., drop into a shower drain, roll under a toilet, fall into a sink, etc.) when being mounted onto or dismounted from a door. Typical handle structures involve small components (e.g., set screws, washers, caps, etc.) that are susceptible to being inadvertently misplaced or lost (e.g., dropped into a shower drain, dropped down a sink, rolled under a toilet, etc.). Some handles may be hollow at one side, and a middle position or portion of a side of the handle is still closed (e.g., blocked, obstructed, etc.), which causes the handle to be unable to achieve a completely hollow effect visually (e.g., the handle doesn’t appear to be a hollow tube extending through the door). Some hollow handles can only be mounted (e.g., screwed together) by grasping outer circular surfaces on the two sides of the handle while mounting, which is difficult to lock tightly (e.g., supply sufficient torque to tighten into place, supply sufficient compressive force to lock the hollow handle into place relative to the mounting location on the shower door, difficult to tighten the handle because the surfaces are slippery). Some hollow handles have poor waterproofness. For example, some hollow handles may appear hollow (or be hollow) and allow water to flow out of a handle hole when the handle is installed in a shower room, which can cause water damage, mold growth, or pooling of water in areas without a drainage system.

The application aims to provide a shower handle to overcome the shortcomings of the prior art, such as difficult disassembly and poor waterproofness. Aiming at the technical problems, the application provides the following technical solutions.

The following clearly and completely describes technical solutions with reference to the accompanying drawings. The described embodiments are merely some but not all of the embodiments of the application. Based on the embodiments of the application, all other embodiments obtained by those having ordinary skills in the art without going through any creative work shall fall within the scope of protection of the application. In addition, the technical features involved in different embodiments of the application described below can be combined with each other as long as they do not constitute conflicts with each other.

Referring generally to the figures, described herein are systems and methods for a handle structure enabling an efficient and reliable operation of a shower door. In some embodiments, a handle structure includes a first handle body and a second handle body which are respectively located on two sides of a door panel. The first handle body and the second handle body may be sleeve structures and/or respectively include a handle portion and a connecting portion. The connecting portion of the first handle body may be detachably connected with the connecting portion of the second handle body. The handle structure may include a transparent plate (e.g., transparent decorative sheet, transparent disk, etc.) within and sealingly (e.g., hermetically) connected with the connecting portions of the first handle body and the second handle body. The handle structure described herein facilitates improved convenience for the user to install and assemble the handle structure and improves waterproofing (e.g., leak prevention, water containment, etc.) among other advantages discussed herein.

In a handle structure, a first handle body and the second handle body are detachably connected, so that the handle structure can be conveniently disassembled; in addition, the handle structure is also provided with the transparent decorative sheet which is within and hermetically connected with the connecting portions of the first handle body and the second handle body, so that water inside the shower (e.g., on the inside surface of the door panel) will not flow to the outside of the door panel along the hollow portion of the handle structure, thus improving waterproofness of the handle structure; furthermore, the handle structure is provided with the transparent decorative sheet at the hollow portions of the first handle body and the second handle body, which does not affect a visual hollow effect of the handle structure after mounting.

Figure 2:
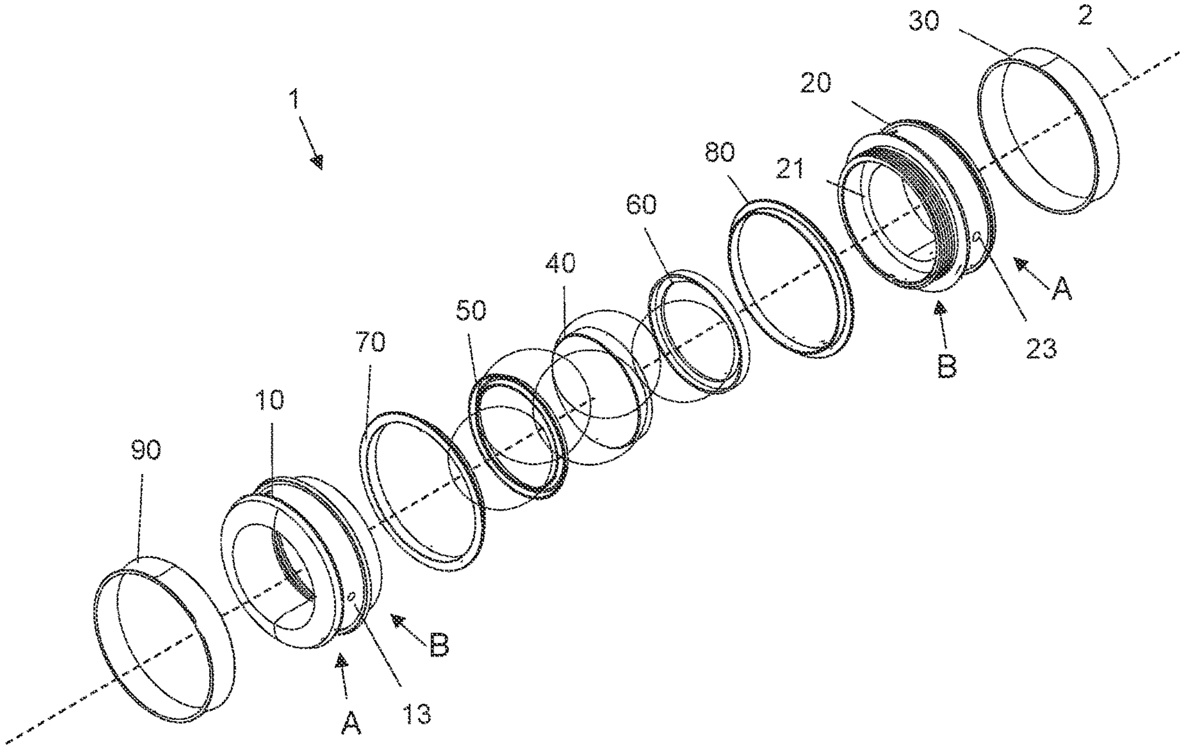
FIG. 2 is an exploded view of the handle structure of FIG. 1, according to some embodiments.
Figure 3:
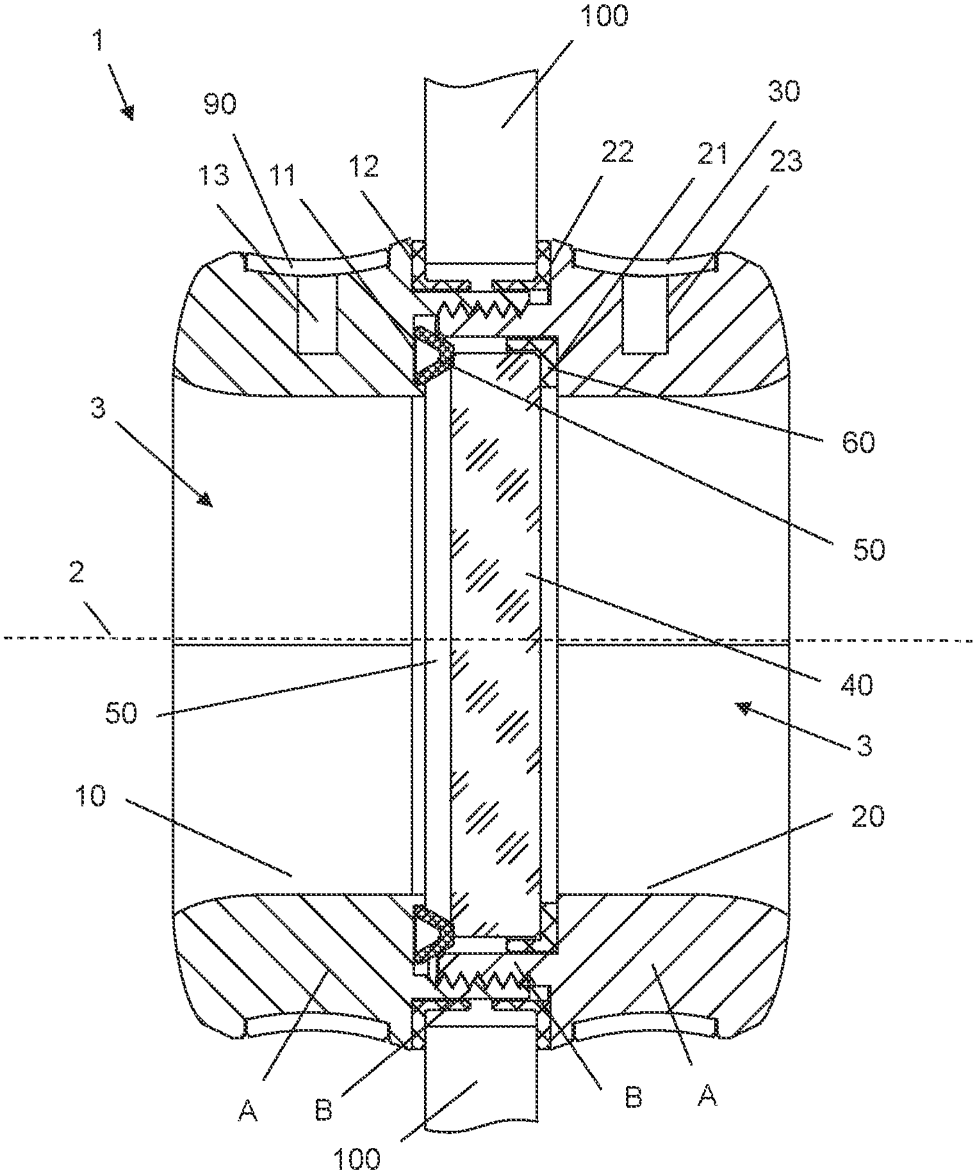
FIG. 3 is a sectional view of the handle structure of FIG. 1, according to some embodiments.

As shown in FIGS. 1-3, a handle structure (e.g., shower handle, hollow shower handle, visually hollow shower handle, etc.) for use in a shower environment (e.g., for use on a glass door of a shower room, for use in a door body, for installation on a door panel 100) is shown as handle structure 1. The handle structure 1 includes a first handle body 10 configured to be located on an inner side of a door panel 100 (e.g., such that the first handle body 10 protrudes into the shower space when installed on the door panel 100) and a second handle body 20 located on an outer side of the door panel 100 (e.g., such that it protrudes away from the shower space when installed on the door panel 100). In some embodiments, the first handle body 10 and the second handle body 20 are sleeve structures (e.g., tubular structures, pipe-like structures, hollow cylinder structures, etc.) that provide a visually hollow effect (e.g., appearing to be or being a hollow cylinder, a cored cylinder, a tube, a pipe, or other shape where visible light can pass through a hole, a conduit, a passage, etc. defined through the shape). In some embodiments, the first handle body 10 and the second handle body 20 respectively comprise a handle portion A and a connecting portion B. The handle portion A facilitates a user grasping surfaces of the portion to open or close the door panel 100. The connecting portion B facilitates a connection between the first handle body 10 and the second handle body 20. For example, the connecting portion B may include one or more coupling features such as threading, press fit fasteners, detents, etc. In some embodiments, the connecting portion B of the first handle body 10 is detachably connected with the connecting portion B of the second handle body 20 (e.g., via engagement between corresponding internal and external threading). In some embodiments, the handle structure 1 further includes a transparent plate (e.g., a transparent body, a transparent puck, a transparent disk, a clear disk, window glass, etc.), shown as plate 40, within and hermetically connected with the connecting portions B of the first handle body 10 and the second handle body 20.

In some embodiments, because the first handle body 10 and the second handle body 20 are detachably connected through the respective connecting portions B thereof, it is convenient to disassemble the handle structure 1. For example, conveniently, a user may dismount or disassemble the handle structure 1 by decoupling the respective connecting portions B (e.g., by unscrewing the first handle body 10 from the second handle body 20, etc.). In addition, the handle structure 1 further includes the plate 40 within and sealingly (e.g., hermetically) connected to the connecting portions B of the first handle body 10 and the second handle body 20. The plate 40 sealingly connected to the connecting portions B can provide leak prevention and improve the waterproofness (e.g., leak prevention ability) of the handle structure 1 such that water (or other liquids) inside the shower room (e.g., on the interior facing side of door panel 100) are prevented from flowing to the outside of the shower room (e.g., to the outward side of the door panel 100) through the handle structure 1 (e.g., though the hollow portions 3). For example, the handle structure 1 may extend along and define a central axis 2. The handle structure 1 may be hollow (e.g., open, unobstructed) along at least a portion of the length of the axis 2 (e.g., the portions other than the plate 40). The portion of the axis 2 corresponding to the plate 40 within the handle structure 1 may not be hollow (e.g., blocked, obstructed), such that fluids are unable to flow through the portion of the axis 2 corresponding to the plate 40. In this way, fluids are unable to flow along the axis 2 between the hollow portions 3 of the handle structure 1. However, visible light may pass along the axis 2 due to the plate 40 allowing visible light to pass. In this way, a handle structure 1 may appear (e.g., to a human eye) to be hollow along the entire axis 2 while the handle structure 1 is not hollow along the entire axis 2. Advantageously, the handle structure 1 enables an intriguing visual effect of a hole through a door of a shower enclosure without degrading the water retention abilities of a door panel for a shower room, which can provide for an improved user experience.

In some embodiments, the first handle body 10 and the second handle body 20 are made of metal (e.g., aluminum, stainless steel, nickel plated metal, a metal alloy, etc.). In some embodiments, the plate 40 is made of a toughened glass or transparent acrylic, and is not limited to pure transparent color. For example, the plate 40 may be translucent and/or a visual appearance of being blue, red, etc. In some embodiments, the plate 40 may have optical characteristics similar to an optical characteristic of a door panel 100 (e.g., frosted, hued, distorted, etc.). In some embodiments, the handle structure 1 is sold as a kit including multiple plates 40 having varying optical features. In some embodiments, a user may interchange a plate 40 for a different plate 40 having different optical characteristics based on user need.

In some embodiments, the plate 40 is radially and hermetically connected with the connecting portions B of the first handle body 10 and the second handle body 20 through a first sealing member (e.g., gasket 50).

As shown in FIGS. 2 and 3, the handle portion A and the connecting portion B of the first handle body 10 are transitioned through a first shoulder 11, the handle portion A and the connecting portion B of the second handle body 20 are transitioned through a second shoulder 21, the plate 40 and the first sealing ring are located in a region between the first shoulder 11 and the second shoulder 21, the first sealing ring is sleeved on the plate 40, and an outer ring of the first sealing ring is abutted against an inner wall of the connecting portion B of the first handle body 10 or the second handle body 20. If water outside the first handle body 10 and the second handle body 20 is projected to permeate into the first handle body 10 and the second handle body 20 along the connecting portions B therebetween, the first sealing ring can prevent the water from continuing to flow, thus enabling a first sealing of the handle structure 1.

In some embodiments, one protective member (e.g., gasket, o-ring, elastomeric member, etc.) is respectively arranged between the plate 40 and the first shoulder 11 and between the plate 40 and the second shoulder 21. In such embodiments, the protective member may avoid wear on the plate 40 caused by the plate 40 being directly contacted with the first handle body 10 and the second handle body 20. For example, the protective member may prevent wear on the plate 40 when the plate 40 is made of a softer material than the first handle body 10 and/or the second handle body 20.

As shown in FIG. 3, the plate 40 is axially and hermetically connected with the connecting portions B of the first handle body 10 and the second handle body 20 through a first internal sealing gasket 50, according to some embodiments. In some embodiments, each of the components of the handle structure 1 are substantially circular and, when assembled, are substantially concentric about axis 2. The first internal sealing gasket 50 may be configured to sealingly engage an area near a perimeter of the plate 40. Sealing members, such as the first internal sealing gasket 50, may be made of a resilient (e.g., elastomeric) material such that when the sealing member is compressed between surfaces of the first handle body 10, the plate 40, and/or the second handle body 20, the sealing member generates a sealing force against the surfaces that are in forced contact with the sealing member.

As shown in FIG. 3, the handle portion A and an inner wall of the connecting portion B of the first handle body 10 are transitioned through a first shoulder 11, the handle portion A and an inner wall of the connecting portion B of the second handle body 20 are transitioned through a second shoulder 21, the plate 40 and the first internal sealing gasket 50 are located in a region between the first shoulder 11 and the second shoulder 21, and the plate 40 is abutted against the first shoulder 11 or the second shoulder 21 through the first internal sealing gasket 50.

In some embodiments, the first handle body 10 and the second handle body 20 are connected and fixed through threaded connection and the connecting portion B of the first handle body 10 is provided with an internal thread, and the connecting portion B of the second handle body 20 is provided with an external thread. In some embodiments, the first internal sealing gasket 50 is located between an end portion of the connecting portion B of the second handle body 20 and the first shoulder 11, and the plate 40 is located between the first internal sealing gasket 50 and the second shoulder 21. As the water outside the first handle body 10 and the second handle body 20 first passes through the end portion of the connecting portion B of the second handle body 20 when the water is projected to permeate into the first handle body 10 and the second handle body 20 along the connecting portions B therebetween, advantageously, the first internal sealing gasket 50 at this position prevents the water from continuously flowing to the side of the plate 40.

In some embodiments, in order to avoid wear and/or leaking attributed to direct contact of the plate 40 with the second handle body 20, a protective gasket 60 is arranged between the plate 40 and the second shoulder 21 of the second handle body 20. In some embodiments, the gasket 60 is shaped as an annular gasket with an L-shaped radial section, which is may be sleeved on an end portion of the plate 40. The protective gasket 60 can prevent the plate 40 from being forced into direct contact with the second handle body 20. During installation, under the action of the first internal sealing gasket 50, the protective gasket 60 sleeved on the plate 40 is abutted against the second shoulder 21. The gasket 50 may have an approximately U-shaped or V-shaped radial cross section and may force the plate 40 against the gasket 60 such that the gasket 60 is compressed between the handle body 20 and the plate 40.

As shown in FIG. 3, the first internal sealing gasket 50 is shaped as an annular gasket structure with a V-shaped radial section, and the end portion of the connecting portion B of the second handle body 20 is provided with a chamfered structure. An outer wall of the first internal sealing gasket 50 is matched with a chamfered portion of the connecting portion B of the second handle body 20, which increases a sealing contact surface and has high sealing reliability. In addition, the V-shaped gasket structure may have a relatively large deformation in the axial direction, so that the protective gasket 60 sleeved on the plate 40 can be tightly abutted against the second shoulder 21 of the second handle body 20.

In some embodiments, in order to form a reliable seal between the handle structure 1 and the door panel 100, the handle structure 1 further includes a first external sealing gasket 70 located on inner side the door panel 100 and a second external sealing gasket 80 located on outer side the door panel 100. In some embodiments, the first external sealing gasket 70 is sleeved on an outer wall of the connecting portion B of the first handle body 10, and the second external sealing gasket 80 is sleeved on an outer wall of the connecting portion B of the second handle body 20.

In some embodiments, the handle portion A and the outer wall of the connecting portion B of the first handle body 10 are transitioned through a third shoulder 12, and the handle portion A and the outer wall of the connecting portion B of the second handle body 20 are transitioned through a fourth shoulder 22. The first external sealing gasket 70 is located between an inner wall of the door panel 100 and the third shoulder 12, and the second external sealing gasket 80 is located between an outer wall of the door panel 100 and the fourth shoulder 22. The handle structure 1 can be reliably sealed with the door panel 100 by arranging the first external sealing gasket 70 and the second external sealing gasket 80.

In some embodiments, in order to facilitate mounting and fixing the handle structure 1, at least one tool hole (e.g., tool receiver, lever arm hole, etc.), shown as fastening mounting hole 13 is arranged on outer sides of the handle portion A of the first handle body 10, and at least one hole, shown as fastening mounting hole 23 is arranged an outer side of the handle portion A of the second handle body 20. The fastening mounting holes 13, 23 may be used with tools configured to engage the holes 13, 23 and facilitate fastening the first handle body 10 and the second handle body 20. For example, the fastening mounting holes 13, 23 may be suitable for inserting an inner hexagonal fastening tool, and when fastening the first handle body 10 and the second handle body 20, the inner hexagonal fastening tool can drive the first handle body 10 and the second handle body 20 to rotate reversely to realize the thread connection between the two (e.g., by providing large radius for applying a torque to screw the first handle body 10 and the handle body 20 together via the respective connecting portions B). Advantageously, the holes 13, 23 provide for an installer to supply a higher toque and ensure thread locking strength and ensure that the handle structure 1 is not loose.

In some embodiments, the handle structure 1 further comprises a first anti-slip sleeve 90 sleeved on the handle portion A of the first handle body 10 and a second anti-slip sleeve 30 sleeved on the handle portion A of the second handle body 20, wherein the first anti-slip sleeve 90 and the second anti-slip sleeve 30 cover the holes 13, 23 when installed on the handle portion A. The arrangement of the first anti-slip sleeve 90 and the second anti-slip sleeve 30 can provide traction, grip, and/or a better contact feeling when the door is opened and closed, and can cover the fastening mounting holes 13, 23 in the handle body at the same time, thus ensuring integrity of an external shape of the handle structure 1 and an intriguing seamless appearance (e.g., the installation features such as the holes 13, 23 are not visible when installed on a door panel 100).

As shown in FIG. 3, a door body (e.g., shower door) includes a door panel 100 and the handle structure 1. The door panel 100 is provided with a mounting hole (e.g., a through hole, the hole in the door panel 100 illustrated in FIG. 3) and partial regions of the connecting portions B of the first handle body 10 and the second handle body 20 in the handle structure 1 are located in the mounting hole. In some embodiments, the door panel 100 is hermetically connected with the handle structure by a gasket (e.g., a door seal gasket, the first external sealing gasket 70) and a second gasket (e.g., a second door seal gasket, the second external sealing gasket 80).

The above-mentioned embodiments are merely examples for clarity of illustration and are not intended to limit the modes of execution. For those of ordinary skills in the art, other different forms of changes or variations can be made on the basis of the above description. It is not necessary or possible to exhaust all the implementations here. Obvious changes or variations derived therefrom are still within the scope of protection of the application.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. It is important to note that any element disclosed in one embodiment may be incorporated or utilized with any other embodiment disclosed herein.

What is claimed is:

1. A handle structure, comprising:

a first handle body having a first handle portion, a first connecting portion, and a first shoulder disposed along an inner wall of the first handle portion, wherein the first shoulder defines a transition between the first handle portion and an inner wall of the first connecting portion;

a second handle body having a second handle portion, a second connecting portion, and a second shoulder disposed along an inner wall of the second handle portion, wherein the second shoulder defines a transition between the second handle portion and an inner wall of the second connecting portion;

a transparent plate; and a first gasket;

wherein the first handle body and the second handle body are hollow;

wherein the first connecting portion is detachably connected with the second connecting portion when the first handle body and the second handle body are in an installed position; and wherein the transparent plate and the first gasket are disposed between the first shoulder and the second shoulder, the transparent plate abutting against one of the first shoulder or the second shoulder through the first gasket such that the transparent plate is sealingly connected with the first connecting portion and the second connecting portion when the first handle body and the second handle body are in the installed position.

2. The handle structure of claim 1, further comprising a first gasket, and wherein the transparent plate is axially and hermetically connected with the first connecting portion and the second connecting portion through the first gasket.

3. The handle structure of claim 1, further comprising a second gasket, wherein a first portion of the second gasket is abutted against one of the first shoulder or the second shoulder, and a second portion of the second gasket is abutted against one side of the transparent plate spaced from the first gasket.

4. The handle structure of claim 1, wherein the transparent plate is radially and hermetically connected with the first connecting portion and the second connecting portion through a first sealing ring.

5. The handle structure of claim 4, wherein the transparent plate and the first sealing ring are disposed between the first shoulder and the second shoulder;

wherein the first sealing ring is sleeved on the transparent plate; and wherein an outer ring of the first sealing ring is abutted against an inner wall of one of the first connecting portion or the second connecting portion.

6. The handle structure of claim 5, further comprising a first protective gasket and a second protective gasket, wherein the first protective gasket is configured to be located between the transparent plate and the first shoulder, and the second protective gasket is configured to be located between the transparent plate and the second shoulder.

7. The handle structure of claim 1, wherein the first connecting portion comprises threading corresponding to threading of the second connecting portion.

8. The handle structure of claim 1, further comprising a first external gasket and a second external gasket, the first external gasket sleeved on an outer wall of the first connecting portion, and the second external gasket sleeved on an outer wall of the second connecting portion.

9. The handle structure of claim 1, wherein the first handle portion and the second handle portion define at least one tool hole configured to receive a tool and facilitate fastening the first handle body and the second handle body.

10. The handle structure of claim 9, further comprising:

a first anti-slip sleeve configured to be sleeved on the first handle portion; and a second anti-slip sleeve configured to be sleeved on the second handle portion;

wherein the first anti-slip sleeve and the second anti-slip sleeve are configured to cover the at least one tool hole when sleeved on the first handle portion and the second handle portion.

11. A shower door, comprising:

a door panel; and a handle structure, comprising:

a first handle body and a second handle body, the first handle body and the second handle body respectively located on two sides of the door panel, wherein the first handle body and the second handle body are sleeve structures and respectively comprise a handle portion having a shoulder disposed on an inner wall of the handle portion and a connecting portion, and the connecting portion of the first handle body is detachably connected with the connecting portion of the second handle body;

wherein the shoulder defines a transition between the handle portion and an inner wall of the connecting portion of the first handle body and the second handle body;

a transparent plate disposed between the shoulder of the first handle body and the shoulder of the second handle body and hermetically connected with the connecting portions of the first handle body and the second handle body; and a sealing ring disposed between the shoulder of the first handle body and the shoulder of the second handle body, the sealing ring being sleeved on the transparent plate, wherein an outer ring of the sealing ring is abutted against an inner wall of one of the connecting portion of the first handle body or the connecting portion of the second handle body.

12. The shower door of claim 11, wherein the handle structure comprises a first gasket, and wherein the transparent plate is axially and hermetically connected with the connecting portions through the first gasket.

13. The shower door of claim 11, wherein the connecting portions comprise threading configured to detachably couple the first handle body and the second handle body.

14. The shower door of claim 11, wherein the transparent plate is configured to fluidly block a passage between hollow portions of the first handle body and the second handle body.

15. A handle structure, comprising:

a first hollow handle body defining a first conduit and comprising first handle portion and a first connecting portion;

a second hollow handle body defining a second conduit and comprising second handle portion and a second connecting portion; and a transparent plate configured to fluidly separate the first conduit and the second conduit when the first connecting portion and the second connecting portion are detachably coupled;

wherein each of the first handle portion and the second handle portion define at least one tool hole configured to receive a tool and facilitate coupling the first hollow handle body and the second hollow handle body.

16. The handle structure of claim 15, wherein the second connecting portion is configured to detachably couple with the first connecting portion.

17. The handle structure of claim 15, wherein the first connecting portion and the second connecting portion comprise threading.

18. The handle structure of claim 15, wherein the first conduit and the second conduit extend along an axis when the second connecting portion is coupled with the first connecting portion.

19. The handle structure of claim 18, wherein the transparent plate is hermetically connected with the first connecting portion and the second connecting portion.

* * * * *